United States Patent
Zhao et al.

(10) Patent No.: US 12,457,112 B2
(45) Date of Patent: Oct. 28, 2025

(54) BLOCKCHAIN-BASED INTERCONNECTED VEHICLE AUTHENTICATION SYSTEM AND METHOD

(71) Applicant: ELECTRIC POWER RESEARCH INSTITUTE, CHINA SOUTHERN POWER GRID, Guangdong (CN)

(72) Inventors: Yun Zhao, Guangdong (CN); Yong Xiao, Guangdong (CN); Chao Cui, Guangdong (CN); Haolin Wang, Guangdong (CN); Bin Qian, Guangdong (CN); Ziwen Cai, Guangdong (CN)

(73) Assignee: ELECTRIC POWER RESEARCH INSTITUTE, CHINA SOUTHERN POWER GRID, Guangdong (CN)

( * ) Notice: Subject to any disclaimer, the term of this patent is extended or adjusted under 35 U.S.C. 154(b) by 93 days.

(21) Appl. No.: 18/559,569

(22) PCT Filed: Mar. 15, 2022

(86) PCT No.: PCT/CN2022/080857
§ 371 (c)(1),
(2) Date: Nov. 8, 2023

(87) PCT Pub. No.: WO2023/024487
PCT Pub. Date: Mar. 2, 2023

(65) Prior Publication Data
US 2024/0235845 A1    Jul. 11, 2024

(30) Foreign Application Priority Data
Aug. 25, 2021   (CN) .......................... 202110983699.8

(51) Int. Cl.
*H04L 9/00*      (2022.01)
*H04L 9/32*      (2006.01)

(52) U.S. Cl.
CPC .......... *H04L 9/3242* (2013.01); *H04L 9/3247* (2013.01); *H04L 9/50* (2022.05)

(58) Field of Classification Search
CPC ..... H04L 9/50; H04L 9/0643; H04L 2209/84; H04L 63/08; H04L 63/0876; H04L 9/3242; H04L 9/3247
See application file for complete search history.

(56) References Cited

U.S. PATENT DOCUMENTS

2019/0036957 A1* 1/2019 Smith .................... H04L 9/3239
2019/0340269 A1* 11/2019 Biernat ................. H04L 9/3239
(Continued)

FOREIGN PATENT DOCUMENTS

| CN | 109391631 A | 2/2019 |
| CN | 109922475 A | 6/2019 |
| CN | 113610549 A | 11/2021 |

OTHER PUBLICATIONS

Malik et al., "Blockchain Based Secured Identity Authentication and Expeditious Revocation Framework for Vehicular Networks," 2018 17th IEEE International Conference On Trust, Security And Privacy In Computing And Communications/ 12th IEEE International Conference On Big Data Science And Engineering (TrustCom/Big.*

(Continued)

*Primary Examiner* — Roderick Tolentino
(74) *Attorney, Agent, or Firm* — Yue (Robert) Xu; Apex Attorneys at Law, LLP

(57) ABSTRACT

A blockchain-based interconnected vehicle authentication system and method. During message signature process, a registered vehicle verifies a driver, and broadcasts a message. During a message verification process, a registered vehicle checks the message authentication code from a received message based on the system key, and verifies the message based on a public key of a sender of the message.

(Continued)

During a block generation and verification process, the first local trust authority broadcasts a block, and share the block to the second local trust authorities after the block passes verification. During a block confirmation process, second local trust authority makes confirmation with regard to the block and send a confirmation result to the root trust authority, to allow the root trust authority link the block into the blockchain in response to receiving confirmation results from second local trust authorities in a quantity exceeding a predetermined number.

6 Claims, 4 Drawing Sheets

(56) References Cited

U.S. PATENT DOCUMENTS

| | | | |
|---|---|---|---|
| 2019/0347656 A1* | 11/2019 | Lu | H04L 63/0823 |
| 2020/0213826 A1 | 7/2020 | Obaidi | |
| 2020/0307480 A1* | 10/2020 | Troia | H04L 63/12 |
| 2020/0312154 A1* | 10/2020 | Mondello | G05D 1/69 |
| 2020/0396787 A1* | 12/2020 | Brugman | G08B 21/0272 |
| 2020/0401952 A1* | 12/2020 | Gardner | H04L 9/3236 |
| 2021/0014042 A1* | 1/2021 | Sivathanu | H04L 9/0637 |
| 2021/0035090 A1* | 2/2021 | Iannaccone | H04L 9/3247 |
| 2022/0086127 A1* | 3/2022 | Hinh | H04W 12/041 |
| 2023/0029053 A1* | 1/2023 | Manuel-Devadoss | H04L 9/0825 |

OTHER PUBLICATIONS

Liu et al., "Blockchain Empowered Cooperative Authentication With Data Traceability in Vehicular Edge Computing," IEEE Transactions on Vehicular Technology Year: 2020 | vol. 69, Issue: 4 | Journal Article | Publisher: IEEE.*
International Search Report for PCT/CN2022/080857 mailed Jun. 16, 2022, ISA/CN.

* cited by examiner

* # BLOCKCHAIN-BASED INTERCONNECTED VEHICLE AUTHENTICATION SYSTEM AND METHOD

This application is the national phase of International Patent Application No. PCT/CN2022/080857, filed on Mar. 15, 2022, which claims the benefit of Chinese Patent Application No. 202110983699.8, entitled "BLOCKCHAIN-BASED INTERCONNECTED VEHICLE AUTHENTICATION SYSTEM AND METHOD", filed on Aug. 25, 2021 with the Chinese Patent Office, both of which are incorporated herein by reference in their entireties.

FIELD

The present disclosure relates to the technical field of blockchain, and in particular to a blockchain-based interconnected vehicle authentication system and method.

BACKGROUND

With the rapid development of sensing technology and the rapid iteration and optimization of networking technology, in consideration that Internet of Vehicles technology can effectively prevent traffic collisions, reduce the impact of traffic on the environment, and provide optimal travel solutions for operators and users, the Internet of Vehicles has rapidly expanded and developed in recent years. Meanwhile, the automobile industry has undergone large-scale transformation and upgrading in recent years, with the focus shifting from mechanical manufacturing processes to intelligent manufacturing, and intelligent vehicles with better performance are introduced.

By communicating with various sensors and infrastructure in a wireless environment, interconnected vehicles can drive safely and efficiently to avoid accidents. Several security issues, such as privacy protection, secure identity verification, and system reliability, for the interconnected vehicles arise. In vehicular ad hoc networks, a vehicle communicates with other vehicles or infrastructure by using broadcast messages. These mails include not only normal traffic information, but also identification information of a sender. Typically, identify information remains encrypted to ensure privacy. However, traditional centralized systems can use the private information of the sender's vehicle to decrypt the identity information. Therefore, a central server may be targeted by adversaries. In centralized systems, an issue of a single point of failure may arise, and if the central entity is compromised, the stored data will be used maliciously.

SUMMARY

A blockchain-based interconnected vehicle authentication system and method are provided according to the present disclosure, to improve the technical problem of easy leakage of user information and low security for conventional centralized systems.

In view of this, a blockchain-based interconnected vehicle authentication system is provided according to a first aspect of the present disclosure. The interconnected vehicle authentication system includes a root trust authority, local trust authorities and one or more registered vehicles. The local trust authorities include a first local trust authority and second local trust authorities.

The root trust authority is configured to generate a genesis block, a system key and a list of local trust authorities during a boot process.

The registered vehicle is configured to: during a message signature process, verify an identity of a driver, and broadcast a message based on a message authentication code generated by the local trust authorities and the system key after the identity of the driver passes verification.

The registered vehicle is further configured to: during a message verification process, check the message authentication code from a received message based on the system key, and verify the message based on a public key of a sender of the message.

The first local trust authority is configured to: during a block generation and verification process, broadcast a block generated according to a PoW consensus to allow the registered vehicles verify the block, and share the block to the second local trust authorities after the block passes verification.

The second local trust authority is configured to: during a block confirmation process, make confirmation with regard to the block and send a confirmation result to the root trust authority, to allow the root trust authority link the block into the blockchain in response to a reception of confirmation results from second local trust authorities in a quantity exceeding a predetermined number.

In an embodiment, the root trust authority is further configured to: during a registration process,
receive registration information from a to-be-registered vehicle, and return a vehicle public key, a vehicle private key and the system key to the to-be-registered vehicle after the to-be-registered vehicle is successfully registered, where the registration information includes to-be-registered vehicle information and biometric information of a driver.

In an embodiment, the registered vehicle is further configured to: during the message signature,
compare the biometric information of the driver with biometric information in the registration information corresponding to the registered vehicle, and obtain a message broadcast permission in a case that the biometric information of the driver matches the biometric information in the registration information; and
calculate, after generating a message, a first hash value of the message based on the public key of the local trust authorities, combine a second hash value of a target block with the first hash value, encrypt the combined hash value based on the vehicle private key to obtain an encrypted message, and broadcast the encrypted message based on the message authentication code generated by the local trust authorities and the system key.

A blockchain-based interconnected vehicle authentication method, applied to the blockchain-based interconnected vehicle authentication system according to any one of embodiments of the first aspect, is provided according to a second aspect of the present disclosure. The method includes:
generating, by the root trust authority, a genesis block, a system key and a list of local trust authorities during a boot process;
verifying, by the one or more registered vehicles, an identity of a driver, and broadcasting a message based on a message authentication code generated by the local trust authorities and the system key after the identity of the driver passes verification, during a message signature process;
checking, by the one or more registered vehicle, the message authentication code from a received message based on the system key, and verifying the message based on a public key of a sender of the message during a message verification process;

broadcasting, by the first local trust authority, a block generated according to a PoW consensus during a block generation and verification process to allow the one or more registered vehicles verify the block, and share the block to the second local trust authorities after the block passes verification; and making confirmation with regard to the block and sending a confirmation result to the root trust authority, by the second local trust authorities, to allow the root trust authority link the block into the blockchain in response to a reception of confirmation results from second local trust authorities in a quantity exceeding a predetermined number.

In an embodiment, the blockchain-based interconnected vehicle authentication method further includes:

during a registration process, receiving, by the root trust authority, registration information from a to-be-registered vehicle, and returning a vehicle public key, a vehicle private key and the system key to the to-be-registered vehicle after the to-be-registered vehicle is successfully registered, where the registration information includes to-be-registered vehicle information and biometric information of a driver.

In an embodiment, the verifying, by the one or more registered vehicles, an identity of a driver, and broadcasting a message based on a message authentication code generated by the local trust authorities and the system key after the identity of the driver passes verification, during a message signature process includes:

comparing the biometric information of the driver with biometric information in the registration information corresponding to the registered vehicle, and obtaining a message broadcast permission in a case that the biometric information of the driver matches the biometric information in the registration information; and calculating, after generating a message, a first hash value of the message based on the public key of the local trust authorities, combining a second hash value of a target block with the first hash value, encrypting the combined hash value based on the vehicle private key to obtain an encrypted message, and broadcasting the encrypted message based on the message authentication code generated by the local trust authorities and the system key.

It can be seen from the above technical solutions that the present disclosure has the following advantages.

The present disclosure provides a blockchain-based interconnected vehicle authentication system, including the root trust authority, multiple local trust authorities and one or more registered vehicles. The local trust authorities include the first local trust authority and the second local trust authorities. The root trust authority is configured to generate a genesis block, a system key and a list of local trust authorities during a boot process. The registered vehicle is configured to: during a message signature process, verify an identity of a driver, and broadcast a message based on a message authentication code generated by the local trust authorities and the system key after the identity of the driver passes verification. The registered vehicle is further configured to: during a message verification process, check the message authentication code from a received message based on the system key, and verify the message based on a public key of a sender of the message. The first local trust authority is configured to: during a block generation and verification process, broadcast a block generated according to a PoW consensus to allow the registered vehicles verify the block, and share the block to the second local trust authorities after the block passes verification. The second local trust authority is configured to: during a block confirmation process, make confirmation with regard to the block and send a confirmation result to the root trust authority, to allow the root trust authority link the block into the blockchain in response to a reception of confirmation results from second local trust authorities in a quantity exceeding a predetermined number.

In the present disclosure, the registered vehicles broadcast messages based on the message authentication code generated by the local trust authorities and the system key. Vehicles that have not joined the system cannot obtain the message authentication code and the system key, and therefore cannot decrypt information about users of vehicles in the system, thereby ensuring information security. Sharing a block by using blockchain technology can prevent information tampering. In a blockchain-based Internet of Vehicles authentication system, multiple local trust authorities participate in generating and verifying one block based on the consensus, and the generated block is broadcast in the network. Therefore, the system can be decentralized without a central administrator, allowing network participants to access the information of the stored block, making improvement with regard to the technical problem of leakage of user information and low security in conventional centralized systems.

BRIEF DESCRIPTION OF THE DRAWINGS

In order to explain the technical solutions in the embodiments of the present disclosure or in the conventional technology more clearly, the drawings used in the description of the embodiments or the conventional technology will be briefly introduced below. Apparently, the drawings in the following description are only some embodiments of the present disclosure. For those of ordinary skill in the art, other drawings can be obtained based on these drawings without any creative efforts.

DETAILED DESCRIPTION OF THE EMBODIMENTS

Figure 1:
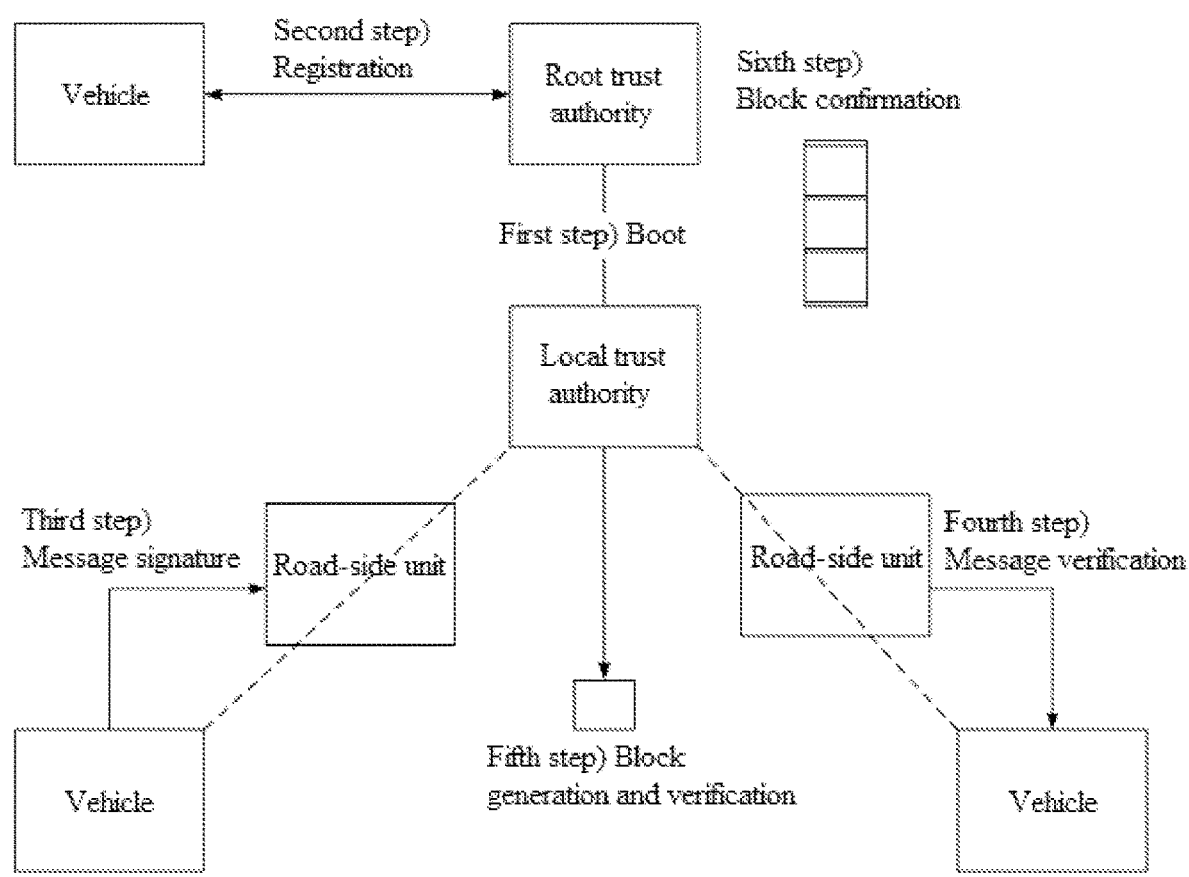
FIG. 1 is a schematic workflow diagram of a blockchain-based interconnected vehicle authentication system according to an embodiment of the present disclosure.

In order to enable those skilled in the art to better understand the technical solution according to the present disclosure, the technical solutions according to the embodiments of the present disclosure will be described clearly and completely hereinafter with reference to the accompanying drawings in the embodiments of the present disclosure. Apparently, the described embodiments are only part of the embodiments according to the present disclosure, rather than all of the embodiments. All other embodiments obtained by those skilled in the art based on the embodiments of the present disclosure without creative efforts fall within the protection scope of the present disclosure.

Vehicle ad hoc network is a subset of mobile ad hoc network. Traditional vehicle ad hoc networks include a trusted authority, a base station connected to a core network, road-side units, and onboard units equipped in a vehicle. The base station acts as the backbone of the entire system and communicates with the road-side units via a secure wired connection. The road-side units forward broadcast messages or send messages to the vehicle through a trusted authority. A vehicle-mounted device performs data processing and broadcasts safety messages to the network. In vehicular ad hoc networks, vehicles use dedicated short-range communications based on IEEE 802.11. There are two representative types of communication such as vehicle-to-infrastructure and vehicle-to-vehicle. Vehicle messages may include a variety of information, including information about traffic, navigation, and emergency situations. There are several security requirements for secure vehicle communications. An important requirement is that messages should not reveal private information about a specific vehicle, such as the true identity. However, a recipient should be able to prove the validity of sender information, or like content in the message. Many studies related to security authentication have been conducted in vehicular networks. However, limitations of conventional technology lead to bottlenecks and concentration of information in the system. In a centralized architecture, single point of failure issues may arise. If the central entity is compromised, the stored data will be used maliciously. In addition, there have been numerous attacks involving impersonation and forgery by network insiders.

For purpose of improvement with regard to the above problems, a blockchain-based interconnected vehicle authentication system is provided according to an embodiment of the present disclosure. The vehicle authentication system includes: a root trust authority, local trust authorities and one or more registered vehicles. The local trust authorities include a first local trust authority and second local trust authorities.

The root trust authority is configured to generate an initial block (also referred to as genesis block), a system key and a list of local trust authorities during a boot process.

The registered vehicle is configured to: during a message signature process, verify an identity of a driver, and broadcast a message based on a message authentication code generated by the local trust authorities and the system key after the identity of the driver passes verification.

The registered vehicle is further configured to: during a message verification process, check the message authentication code from a received message based on the system key, and verify the message based on a public key of a sender of the message.

The first local trust authority is configured to: during a block generation and verification process, broadcast a block generated according to a PoW (Proof Of Work) consensus to allow the registered vehicles verify the block, and share the block to the second local trust authorities after the block passes verification.

The second local trust authority is configured to: during a block confirmation process, make confirmation with regard to the block and send a confirmation result to the root trust authority, to allow the root trust authority link the block into the blockchain in response to a reception of confirmation results from second local trust authorities in a quantity exceeding a predetermined number.

Referring to FIG. 1, during the boot process, the root trust authority generates the genesis block, the system key k, and the list of local trust authorities. The list of local trust authorities is an authentication table that contains identification information.

In an embodiment, the root trust authority is further configured to: during a registration process,
receive registration information from a to-be-registered vehicle, and return a vehicle public key, a vehicle private key and the system key to the to-be-registered vehicle after the to-be-registered vehicle is successfully registered, where the registration information includes biometric information of a driver.

Figure 2:
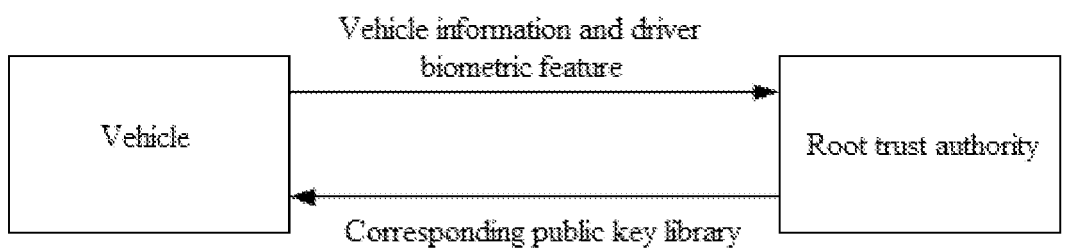
FIG. 2 is a schematic diagram of a vehicle registration process according to an embodiment of the present disclosure.

Referring to FIG. 2, during the registration process, the to-be-registered vehicle that wants to join the Internet of Vehicles first accesses the root trust authority, and uploads the vehicle information and the biometric information of the driver to the root trust authority. After the to-be-registered vehicle is successfully registered, the root trust authority generates and gives the vehicle public key, the vehicle private key and the system key k. Therefore, identity information is stored securely. After the registration process, the to-be-registered vehicle becomes a registered vehicle, and the registered vehicle is authorized in the Internet of Vehicles.

Figure 3:
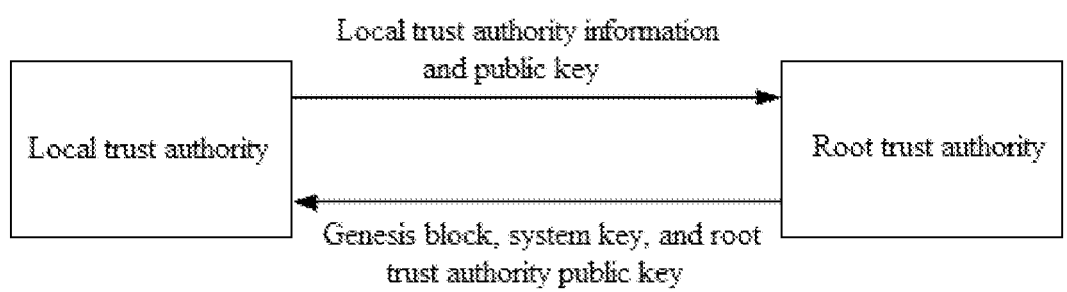
FIG. 3 is a schematic diagram of a registration process of a local trust authority according to an embodiment of the present disclosure.

Referring to FIG. 3, in the registration of the local trust authority, the local trust authority sends the local trust authority information and the public key to the root trust authority. In a case that the local trust authority registers successfully, the local trust authority receives the genesis block, the system key k and the public key of the root trust authority.

In an embodiment, the registered vehicle is further configured to: during the message signature process,
compare the biometric information of the driver with biometric information in the registration information corresponding to the registered vehicle, and obtain a message broadcast permission in a case that the biometric information of the driver matches the biometric information in the registration information; and
calculate, after generating a message, a first hash value of the message based on the public key of the local trust authorities, combine a second hash value of a target block with the first hash value, encrypt the combined hash value based on the vehicle private key to obtain an encrypted message, and broadcast the encrypted message based on the message authentication code generated by the local trust authorities and the system key.

The registered vehicle may obtain the biometric information of a current driver, and compare the biometric information of the driver with the biometric information in the registration information at the time of registration. In a case that the biometric information of the driver matches the biometric information in the registration information, the registered vehicle may obtain the message broadcast permission, that is, the vehicle is permitted to broadcast information only after the identity of the driver passes verification.

The local trust authorities generate a message authentication code and broadcasts with the message authentication code. A registered vehicle with the system key k derives a hash value from the sent message by using the public key of the local trust authorities. Therefore, vehicles without the public key of local trust authorities and the system key k cannot participate in communication.

The registered vehicle generates a message m, the first hash value of the message is calculated by using the public key of the local trust authorities, and the registered vehicle combines a second hash value of a target block (i.e. a block where the vehicle is located) with a first hash value calculated based on the message m. The combined second hash value and the first hash value is encrypted by using the vehicle's private key, marked using the system key k, combined with the message authentication code generated by the local trust authorities, and then broadcast to the Internet of Vehicles.

During the message verification process, the registered vehicle performs the following verification process. The registered vehicle checks the message authentication code from the received message by using the system key k, and then decrypts the message by using the public key of the sender. All registered vehicles within the same local trust authority zone can know each other's public keys via broadcast. The vehicle then determines whether the hash value of the received target block is equal to the hash value of the previous block. If the hash value of the target block is equal to the hash value of the previous block, the registered vehicle compares the received hash value with a hash value calculated based on the received message. If the received hash value is equal to the calculated hash value, the verification is successful.

Figure 4:
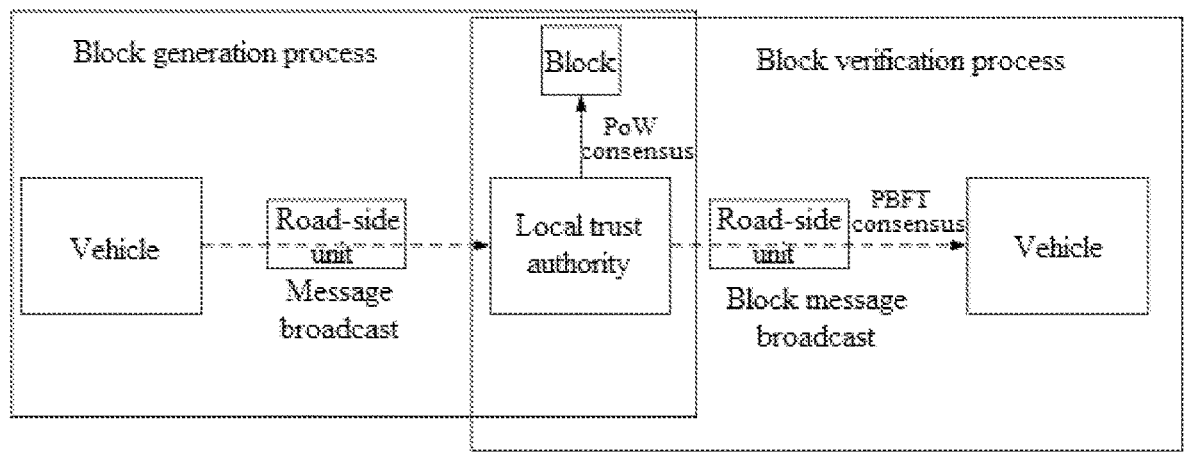
FIG. 4 is a schematic diagram of a block generation and block verification process according to an embodiment of the present disclosure.

Referring to FIG. 4, during the block generation and verification process, the local trust authorities collect messages as the vehicle broadcasts messages and performs verification. Within a certain period, the first local trust authority generates a block based on the PoW consensus. After the block is generated, the block is verified based on a PBFT (Practical Byzantine Fault Tolerance) consensus. A block can be linked into the blockchain if the block is subjected to the block generation and block confirmation process. The block generation process includes a generation process and a verification process. Once a block is created, the verification process is mandatory. The block generation and verification process is performed between the vehicle and the local trust authorities, while the block confirmation process is performed between the local trust authorities and the root trust authority.

The block generation process includes message broadcast and block information broadcast. During the block generation process, the registered vehicle continually broadcasts messages until the message broadcast process ends and the local trust authorities store all the messages. The first local trust authority then broadcasts the information needed to generate the block, including the software version, hash value, generation time, the hash value of the previous block, and difficulty. After the information is broadcast to the network, the first local trust authority attempts to find a hash value that satisfies a specific random number. The block verification process includes submission and acknowledgement. If a block is generated from the block generation process, the first local trust authority initiates block verification by broadcasting the block. A registered vehicle becomes a replica node and first checks the signature in the block by using its list of local trusted authorities. If the identity of the first local trust authority passes verification, then it is believed that the block will be broadcasted in the network. Therefore, the registered vehicles can only verify the submission process in this case. However, if the registered vehicles cannot authenticate the first local trust authority, the registered vehicle should check if it has the same block. As in the preparation process, each vehicle determines whether they have received the same block as other vehicles by sharing the received block. The registered vehicles can guess the number of participants by calculating preparation information. During the submission process, the registered vehicles verify whether the block includes the correct hash value and random number. If the vehicle verifies sufficient preparation messages, the vehicle will send a submission message with regard to the block. If the receiving vehicle receives more than two-thirds of the total submission messages, it sends a acknowledgement message to the local trust authorities. The block confirmation process is then performed between the local trust authorities.

Figure 5:
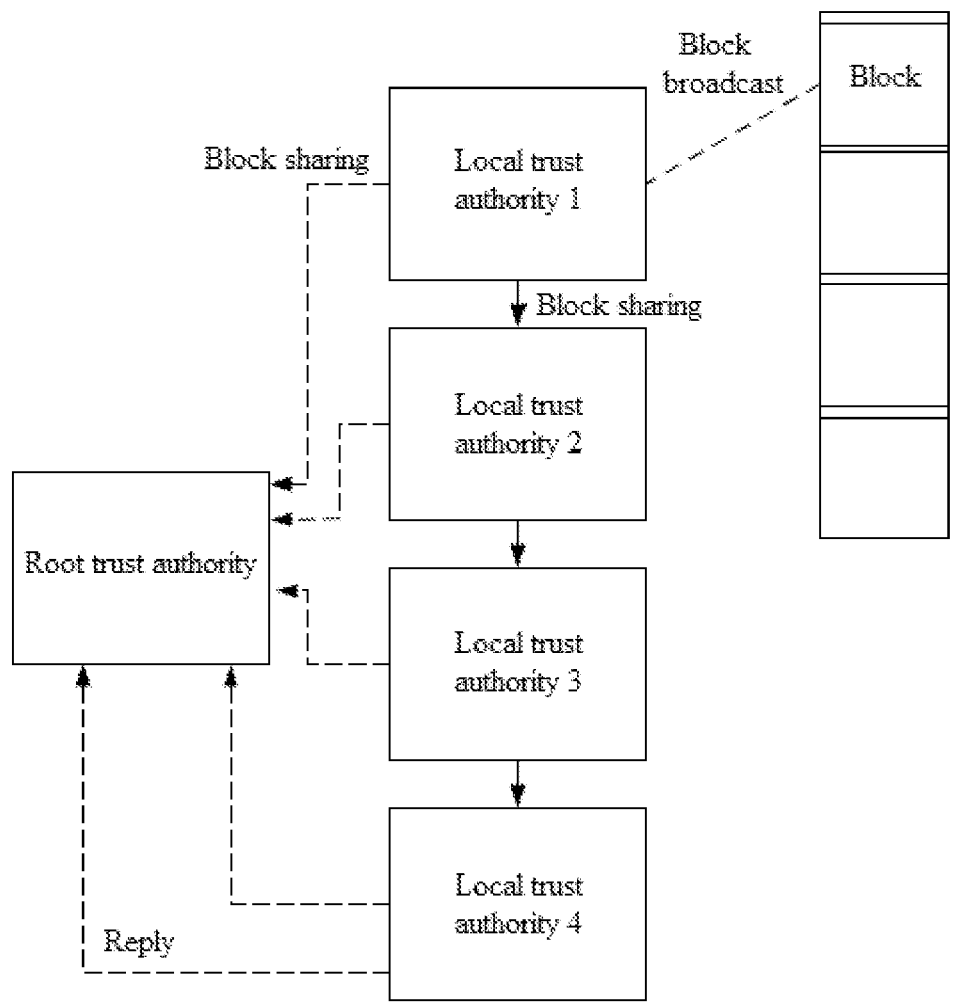
FIG. 5 is a schematic diagram of a block confirmation process according to an embodiment of the present disclosure.

In the block confirmation process, once a block is verified, the first local trust authority shares the block with the second local trust authorities and the root trust authority. After the confirmation process, the root trust authority receives the confirmed block from the second local trust authorities. The block confirmation process includes block broadcast, block confirmation and acknowledgement. The process is performed via wired communication and is therefore much faster than the previous verification process. The Land Transport Authority can broadcast a district in which the total number of votes received exceeds two-thirds of the total number of vehicles in its area. The first local trust authority sends the block to the second local trust authorities, and the second local trust authorities verify the block using information included in a header of the block. After verification, each second local trust authority sends the verification result. If the root trust authority receives the confirmation messages from two-thirds of the total number of second local trust authorities, the root trust authority checks the acknowledgement message and finally links the block into the blockchain. By sharing the blockchain, all connected vehicles can view a record of previous messages. Therefore, the vehicles authenticate the messages in a distributed manner without the help of a center such as a root trust authority and there is no need for the help of the center. These vehicles can decide whether to trust newly broadcast messages based on the blockchain. The block confirmation process may be referred to FIG. 5. In FIG. 5, the local trust authority 1 is the first local trust authority, and the local trust authorities 2, 3, and 4 are the second local trust authorities. After generating the block, the local trust authority 1 broadcasts and shares the block to the root trust authority and the second local trust authorities. The second local trust authorities verify the block and acknowledge to the root trust authority. If the root trust authority receives confirmation messages from two-thirds of the total number of second local trust authorities, the root trust authority checks the acknowledgement message and eventually links the block into the blockchain.

In an embodiment of the present disclosure, the registered vehicles broadcast messages based on the message authentication code generated by the local trust authorities and the system key. Vehicles that have not joined the system cannot obtain the message authentication code and the system key, and therefore cannot decrypt information about users of vehicles in the system, thereby ensuring information security. Sharing a block by using blockchain technology can prevent information tampering. In a blockchain-based Internet of Vehicles authentication system, multiple local trust authorities participate in generating and verifying a block based on the consensus, and the generated block is broadcast in the network. Therefore, the system can be decentralized without a central administrator, allowing network participants to access the information of the stored block, making improvements with regard to the technical problem of leakage of user information and low security in conventional centralized systems.

An embodiment of a blockchain-based interconnected vehicle authentication system according to the present disclosure is described above, and an embodiment of a blockchain-based interconnected vehicle authentication method according to the present disclosure is described hereinafter.

A blockchain-based interconnected vehicle authentication method, applied to the blockchain-based interconnected vehicle authentication system in the above embodiments is provided according to an embodiment of the present disclosure. The method includes the steps 101 to 105.

In step 101, the root trust authority generates a genesis block, a system key and a list of local trust authorities during a boot process.

In step 102, the registered vehicle may verify an identity of a driver, and broadcast a message based on a message authentication code generated by the local trust authorities and the system key after the identity of the driver passes verification, during a message signature process.

In step 103, the registered vehicle may check the message authentication code from a received message based on the system key, and verify the message based on a public key of a sender of the message during a message verification process.

In step 104, the first local trust authority broadcasts a block generated according to a PoW consensus during a block generation and verification process to allow the registered vehicles verify the block, and share the block to the second local trust authorities after the block passes verification.

In step 105, the second local trust authorities confirm the block and send confirmation result to the root trust authority during a block confirmation process, to allow the root trust authority link the block into the blockchain in response to a reception of confirmation results from second local trust authorities in a quantity exceeding a predetermined number.

In an embodiment, the blockchain-based interconnected vehicle authentication method further includes:
during a registration process, receiving, by the root trust authority, registration information from a to-be-registered vehicle, and returning a vehicle public key, a vehicle private key and the system key to the to-be-registered vehicle after the to-be-registered vehicle is successfully registered, where the registration information includes to-be-registered vehicle information and biometric information of a driver.

In an embodiment, the verifying, by the registered vehicle, an identity of a driver, and broadcasting a message based on a message authentication code generated by the local trust authorities and the system key after the identity of the driver passes verification during a message signature process includes:
comparing the biometric information of the driver with biometric information in the registration information corresponding to the registered vehicle, and obtaining a message broadcast permission in a case that the biometric information of the driver matches the biometric information in the registration information; and
calculating, after generating a message, a first hash value of the message based on the public key of the local trust authorities, combining a second hash value of a target block with the first hash value, encrypting the combined hash value based on the vehicle private key to obtain an encrypted message, and broadcasting the encrypted message based on the message authentication code generated by the local trust authorities and the system key.

The foregoing embodiments are used for describing, instead of limiting the technical solutions of the present disclosure. Those skilled in the art shall understand that although the present disclosure has been described in detail with reference to the foregoing embodiments, modifications can be made to the technical solutions described in the foregoing embodiments, or equivalent replacements can be made to some technical features in the technical solutions. Such modifications or replacements do not cause the essence of corresponding technical solutions to depart from the spirit and scope of the technical solutions of the embodiments of the present disclosure.

The invention claimed is:

1. A blockchain-based interconnected vehicle authentication system, comprising:
   a root trust authority;
   local trust authorities;
   and one or more registered vehicles, wherein the local trust authorities comprise a first local trust authority and second local trust authorities;
   the root trust authority is configured to generate a genesis block, a system key and a list of local trust authorities during a boot process;
   each of the one or more registered vehicles is configured to: during a message signature process, verify an identity of a driver, and broadcast a message based on a message authentication code generated by the local trust authorities and the system key after the identity of the driver passes verification;
   each of the one or more registered vehicles is further configured to: during a message verification process, check the message authentication code from a received message based on the system key, and verify the message based on a public key of a sender of the message;
   the first local trust authority is configured to: during a block generation and verification process, broadcast a block generated according to a Proof Of Work (PoW) consensus to allow the one or more registered vehicles verify the block, and share the block to the second local trust authorities after the block passes verification; and
   the second local trust authority is configured to: during a block confirmation process, make confirmation with regard to the block and send a confirmation result to the root trust authority, to allow the root trust authority link the block into the blockchain in response to a reception of confirmation results from second local trust authorities in a quantity exceeding a predetermined number.

2. The blockchain-based interconnected vehicle authentication system according to claim 1, wherein the root trust authority is further configured to: during a registration process,
   receive registration information from a to-be-registered vehicle, and return a vehicle public key, a vehicle private key and the system key to the to-be-registered vehicle after the to-be-registered vehicle is successfully registered, wherein the registration information comprises to-be-registered vehicle information and biometric information of a driver.

3. The blockchain-based interconnected vehicle authentication system according to claim 2, wherein each of the one or more registered vehicles is further configured to: during the message signature process,
   compare the biometric information of the driver with biometric information in the registration information corresponding to the registered vehicle, and obtain a message broadcast permission in a case that the biometric information of the driver matches the biometric information in the registration information; and calculate, after generating a message, a first hash value of the message based on the public key of the local trust authorities, combine a second hash value of a target block with the first hash value, encrypt the combined hash value based on the vehicle private key to obtain an encrypted message, and broadcast the encrypted message based on the message authentication code generated by the local trust authorities and the system key.

4. A blockchain-based interconnected vehicle authentication method, applied to a blockchain-based interconnected vehicle authentication system, wherein the blockchain-based interconnected vehicle authentication system comprises a root trust authority, local trust authorities and one or more registered vehicles, and the method comprises:

generating, by the root trust authority, a genesis block, a system key and a list of local trust authorities during a boot process;

verifying, by the one or more registered vehicles, an identity of a driver, and broadcasting a message based on a message authentication code generated by the local trust authorities and the system key after the identity of the driver passes verification, during a message signature process;

checking, by the one or more registered vehicles, the message authentication code from a received message based on the system key, and verifying the message based on a public key of a sender of the message during a message verification process;

broadcasting, by the first local trust authority, a block generated according to a Proof Of Work (PoW) consensus during a block generation and verification process to allow the one or more registered vehicles verify the block, and share the block to the second local trust authorities after the block passes verification; and making confirmation with regard to the block and sending a confirmation result to the root trust authority, by the second local trust authorities, during a block confirmation process, to allow the root trust authority link the block into the blockchain in response to a reception of confirmation results from second local trust authorities in a quantity exceeding a predetermined number.

5. The blockchain-based interconnected vehicle authentication method according to claim 4, further comprising:

during a registration process, receiving, by the root trust authority, registration information from a to-be-registered vehicle, and returning a vehicle public key, a vehicle private key and the system key to the to-be-registered vehicle after the to-be-registered vehicle is successfully registered, wherein the registration information comprises to-be-registered vehicle information and biometric information of a driver.

6. The blockchain-based interconnected vehicle authentication method according to claim 5, wherein the verifying, by the one or more registered vehicles, an identity of a driver, and broadcasting a message based on a message authentication code generated by the local trust authorities and the system key after the identity of the driver passes verification, during a message signature process comprises:

comparing the biometric information of the driver with biometric information in the registration information corresponding to the registered vehicle, and obtaining a message broadcast permission in a case that the biometric information of the driver matches the biometric information in the registration information; and calculating, after generating a message, a first hash value of the message based on the public key of the local trust authorities, combining a second hash value of a target block with the first hash value, encrypting the combined hash value based on the vehicle private key to obtain an encrypted message, and broadcasting the encrypted message based on the message authentication code generated by the local trust authorities and the system key.

* * * * *